(12) United States Patent
Koppen

(10) Patent No.: US 11,578,752 B2
(45) Date of Patent: Feb. 14, 2023

(54) BALL JOINT WITH LOCKING BALL SOCKET ASSEMBLY

(71) Applicant: Robert Bosch GmbH, Stuttgart (DE)

(72) Inventor: Scott Koppen, Dexter, MI (US)

(73) Assignee: Robert Bosch GmbH, Stuttgart (DE)

( * ) Notice: Subject to any disclaimer, the term of this patent is extended or adjusted under 35 U.S.C. 154(b) by 734 days.

(21) Appl. No.: 16/475,932

(22) PCT Filed: Nov. 17, 2017

(86) PCT No.: PCT/EP2017/079589
§ 371 (c)(1),
(2) Date: Jul. 3, 2019

(87) PCT Pub. No.: WO2018/127321
PCT Pub. Date: Jul. 12, 2018

(65) Prior Publication Data
US 2019/0345975 A1 Nov. 14, 2019

Related U.S. Application Data

(60) Provisional application No. 62/443,192, filed on Jan. 6, 2017.

(51) Int. Cl.
*F16C 11/06* (2006.01)
*B60S 1/24* (2006.01)

(52) U.S. Cl.
CPC ............ *F16C 11/0604* (2013.01); *B60S 1/24* (2013.01); *F16C 11/0642* (2013.01); *F16C 2326/09* (2013.01); *Y10T 403/32565* (2015.01)

(58) Field of Classification Search
CPC .... B60S 1/24; F16C 11/0604; F16C 11/0614; F16C 11/0619; F16C 11/0623;
(Continued)

(56) References Cited

U.S. PATENT DOCUMENTS 4,380,860 A 4/1983 Riester et al.
4,695,180 A * 9/1987 Saito .................. F16C 11/0604
403/114
(Continued)

FOREIGN PATENT DOCUMENTS

DE 3241551 5/1984
DE 102019219830 A1 * 6/2021 .......... F16C 11/0642
(Continued)

OTHER PUBLICATIONS

PCT International Search Report for PCT/EP2017/079589.

*Primary Examiner* — Josh Skroupa
(74) *Attorney, Agent, or Firm* — Kelly McGlashen; Maginot, Moore & Beck LLP

(57) ABSTRACT

A wiper actuating assembly configured to actuate a windshield wiper arm includes an actuator and a linkage that connects the actuator to the wiper arm. Links of the linkage are joined by ball joints. The ball joints each include a ball stud and a ball socket. The ball portion of the ball stud has an annular ball groove that receives a retaining portion that protrudes inward from the inner surface of the ball socket. The ball groove and retaining portion cooperate to prevent withdrawal of the ball stud from the socket housing.

16 Claims, 7 Drawing Sheets

(58) Field of Classification Search
CPC .............. F16C 11/0642; F16C 11/0657; F16C 11/0661; F16C 11/068; F16C 11/0695; F16C 2326/09; Y10T 403/32565; Y10T 403/32573; Y10T 403/32647; Y10T 403/32729
See application file for complete search history.

(56) References Cited

U.S. PATENT DOCUMENTS

| | | | | |
|---|---|---|---|---|
| 5,572,354 | A * | 11/1996 | Desmond | F16C 11/0604 359/872 |
| 8,038,162 | B2 * | 10/2011 | Knopp | F16C 11/0661 403/122 |
| 11,345,202 | B2 * | 5/2022 | Reddehase | F16C 11/0642 |

FOREIGN PATENT DOCUMENTS

| | | | |
|---|---|---|---|
| EP | 0884489 | 12/1998 | |
| FR | 2136014 | 12/1972 | |
| GB | 885198 | 12/1961 | |
| GB | 2102061 | 1/1983 | |
| WO | 9533139 | 12/1995 | |
| WO | WO-2006110049 A2 * | 10/2006 | .......... F16C 11/0609 |
| WO | WO-2015069237 A1 * | 5/2015 | .......... F16C 11/0623 |

* cited by examiner

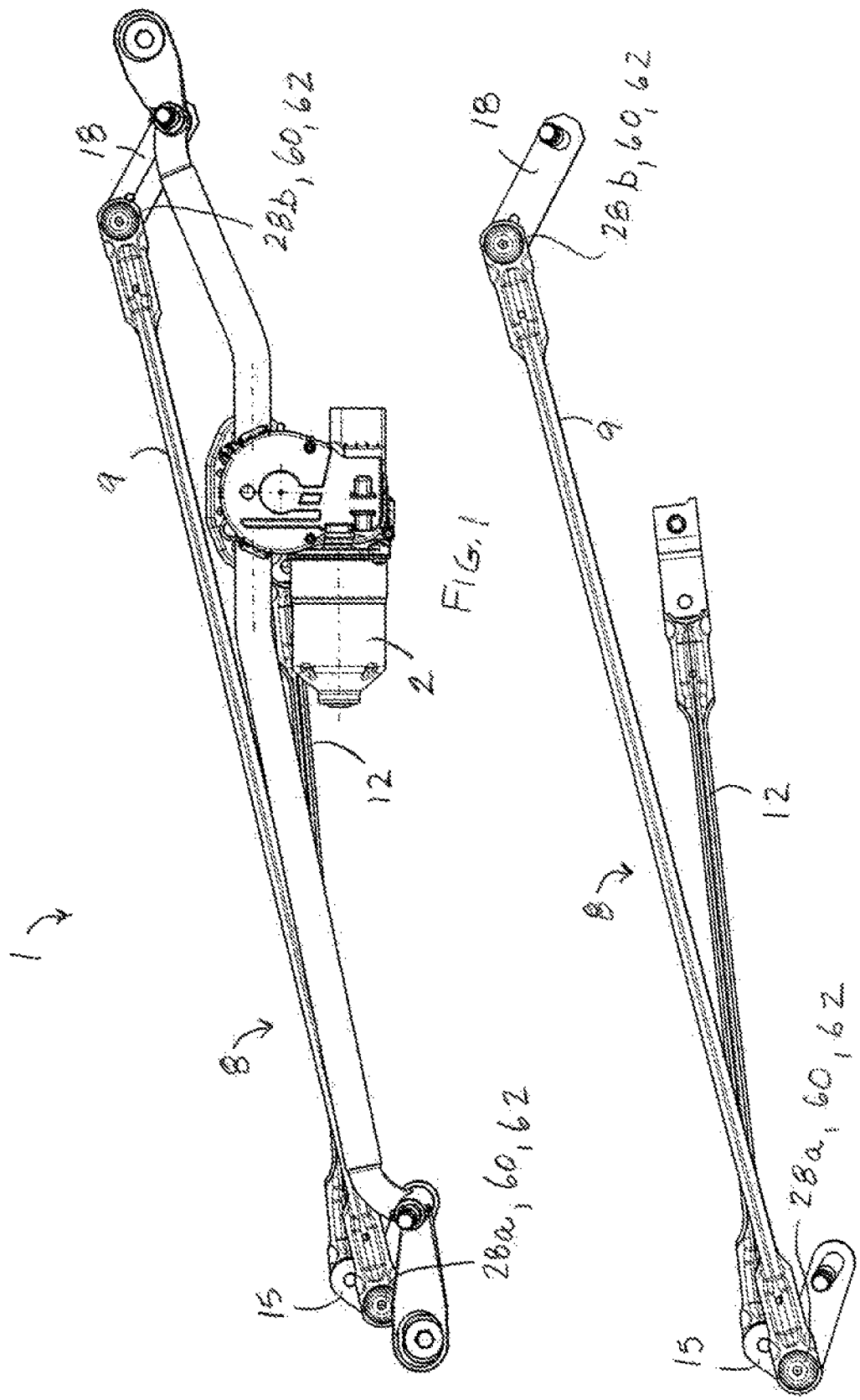

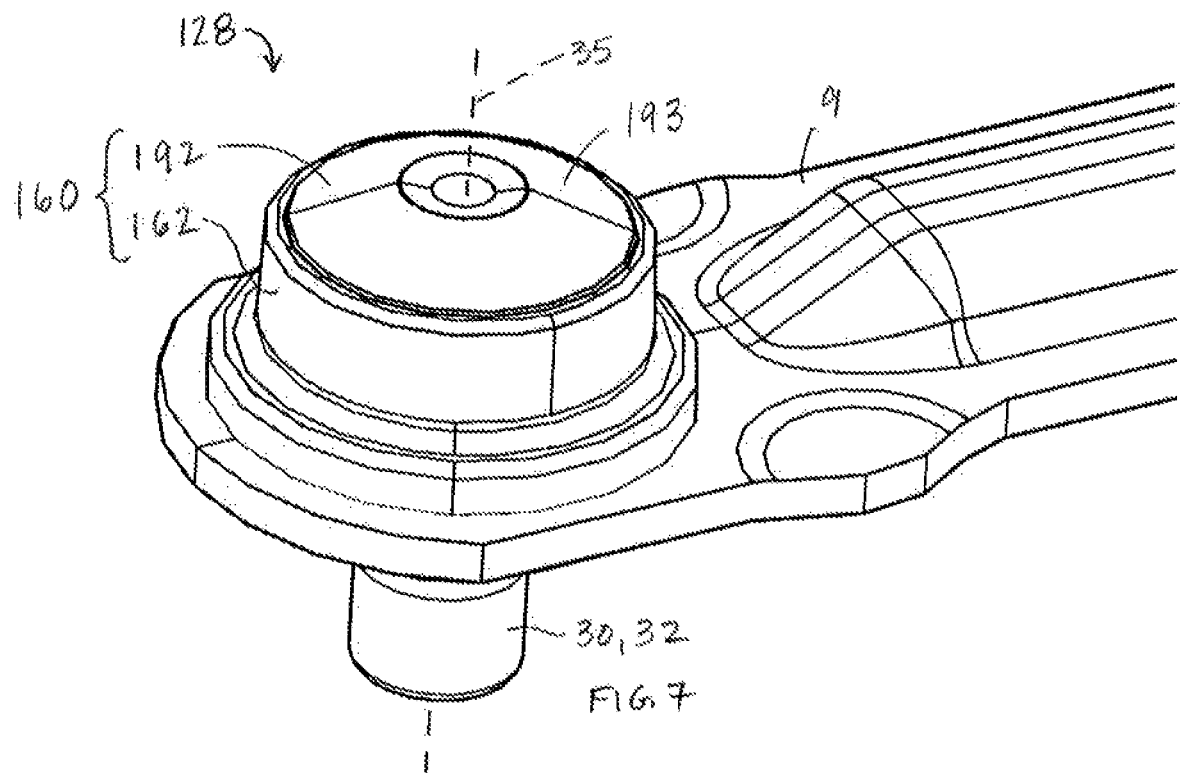
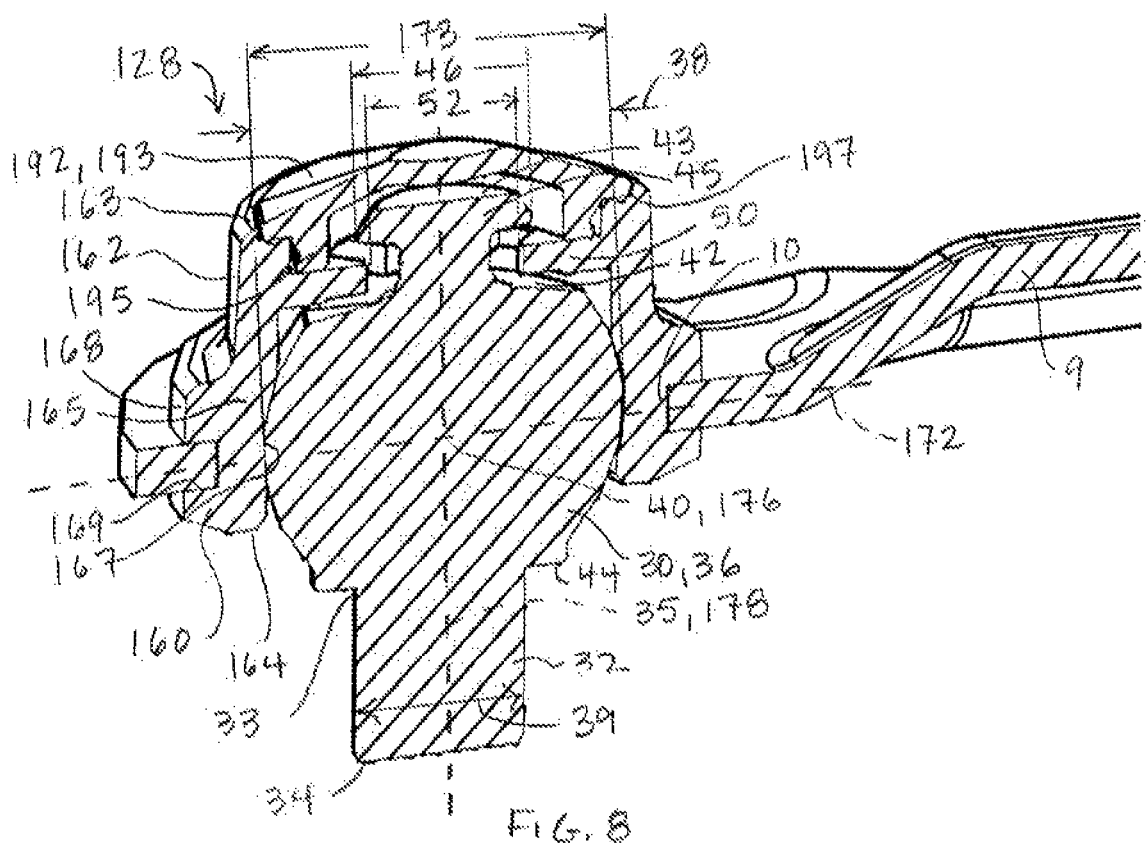

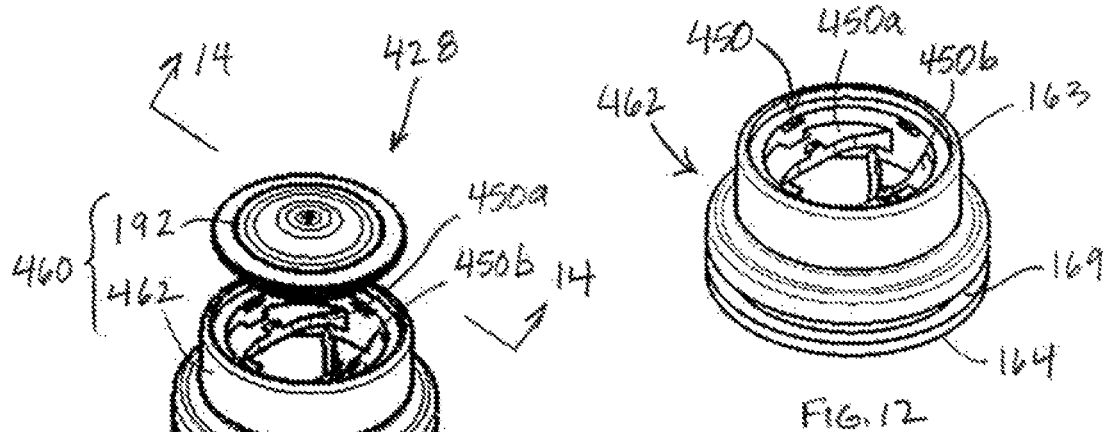
FIG. 11
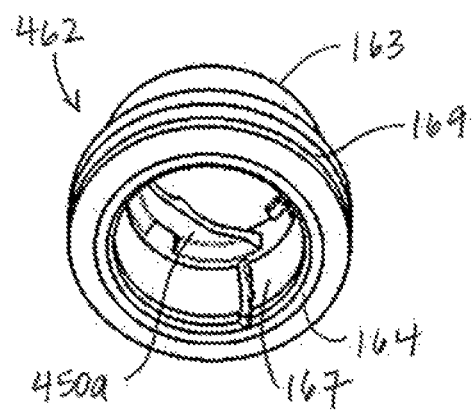
FIG. 12
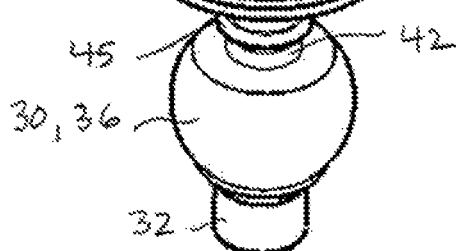
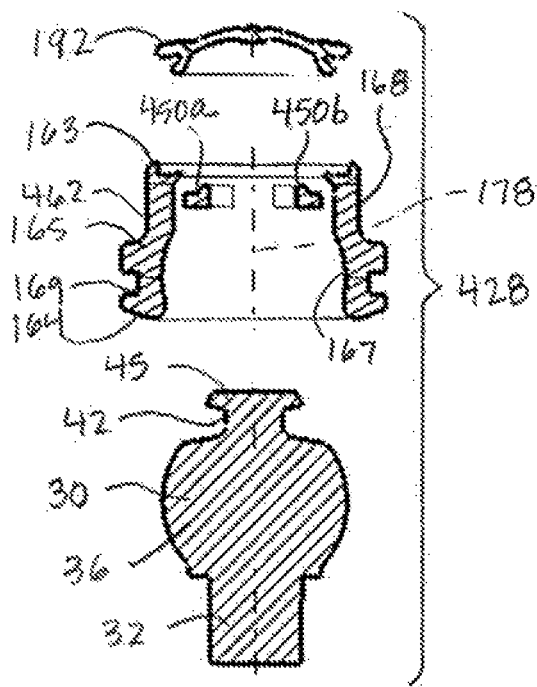
FIG. 14
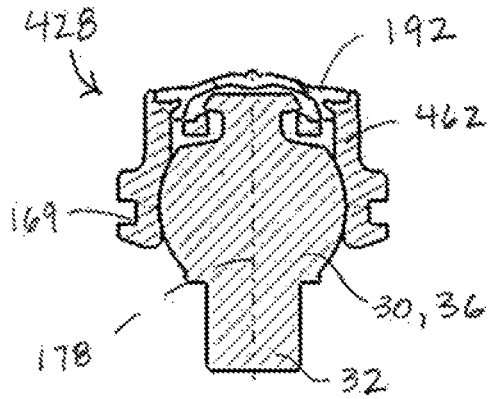
FIG. 15

BALL JOINT WITH LOCKING BALL SOCKET ASSEMBLY

This application is a 35 U.S.C. § 371 National Stage Application of PCT/EP2017/079589, filed on Nov. 17, 2017, which claims the benefit of U.S. Provisional Application No. 62/443,192, which is entitled "Ball Joint With Locking Ball Socket Assembly," and was filed on Jan. 6, 2017, the entire contents of which are hereby expressly incorporated herein by reference.

BACKGROUND

Vehicles typically have a windshield forward of the passenger compartment. A windshield wiper system is positioned adjacent the windshield, and includes wiper arms that support wiper blades. The wiper arms pivot over a predefined range of motion on pivot shafts so that the blades oscillate over the windshield to clear the windshield of moisture, dirt and/or debris. The pivot shaft is driven by a wiper actuating assembly that includes an actuator. The actuator may be connected to the pivot shaft by a linkage system that translates the rotation of the actuator shaft into oscillating motion of the wiper arms. The linkage includes one or more links that transfer force to the pivot shafts via a ball joint that includes a ball socket and a ball stud. The ball socket is mounted in an opening in the link, and the ball stud rotates within the ball socket. Wear of the ball socket over time can lead to disengagement of ball stud from the ball socket. This may lead to loss of wiper system function. A need exists for a ball joint in which the ball stud is prevented from disengaging from the ball socket.

SUMMARY

In some aspects, a ball joint includes a ball stud and a ball socket. The ball stud includes a cylindrical shank, and a ball portion disposed on one end of the shank. The ball portion includes a ball major diameter defined by a line that is perpendicular to a longitudinal axis of the shank and intersects the spherical element at a location of maximum diameter. The ball portion also includes an annular ball groove that is parallel to the ball major diameter and disposed on a side of the ball major diameter that is opposed to the shank. The ball socket includes a ball socket first end, a sidewall that surrounds a periphery of the ball socket first end, and a ball socket second end opposed to the ball socket first end. The ball socket second end is open and defined by a free edge of the sidewall. The sidewall includes an inner surface that has a spherical portion and a retaining portion. The spherical portion receives the ball portion therein. The spherical portion has a shape and dimensions that are complementary to the shape and dimensions of the ball portion. In addition, the retaining portion protrudes inward from the inner surface and includes a terminal edge that resides within the ball groove.

The ball joint may include one or more of the following features: The spherical portion defines a socket major diameter that passes through a center of the spherical contour defined by the spherical portion and extends in parallel to the ball socket second end, and the retaining portion is disposed on a side of the socket major diameter opposed to the ball socket second end. The retaining portion comprises tabs that protrude inward from the inner surface, the tabs being spaced apart along a circumference of the sidewall. An outward-facing surface of at least one tab includes a post that protrudes outward. The terminal edge comprises a continuous annular edge defining a terminal edge diameter that is shorter than the ball major diameter. An annular outer groove is formed in an outer surface of the sidewall, and the outer groove resides in a plane that is parallel to the ball socket second end and includes a center of the spherical portion. In addition, when the outer groove is parallel to the ball major diameter, the retaining portion terminal edge resides within the ball groove in such a way that outer surfaces of the retaining portion are spaced apart from surfaces of the ball groove. The ball portion comprises a ball portion first end that defines a planar surface, and a ball portion second end that is opposed to the first end and is joined to the shank. A crown diameter of the ball portion corresponds to a diameter of the ball portion at a location between the ball groove and the ball portion first end, and the crown diameter is longer than the terminal edge diameter and is shorter than the ball major diameter. An annular outer groove is formed in an outer surface of the sidewall, the outer groove residing in a plane that is parallel to the ball socket second end and includes a center of the spherical portion; and when the outer groove is parallel to the ball major diameter, the ball socket first end is parallel to the ball major diameter and resides below the planar surface. The ball socket first end is closed via a detachable cover. The detachable cover provides a fluid seal at the ball socket first end. The detachable cover overlies a portion of the outer surface of the socket housing. An inner surface the detachable cover includes a protrusion, and the ball socket second end includes a retaining groove that is configured to receive the protrusion in such a way that the detachable cover is retained on the ball socket.

In some aspects, a link assembly includes a link having a first end including a first opening. The link assembly also includes a ball joint that includes a ball stud and a ball socket. The ball stud has a cylindrical shank, and a ball portion disposed on one end of the shank. The ball portion includes a ball major diameter defined by a line that is perpendicular to a longitudinal axis of the shank and intersects the spherical element at a location of maximum diameter. The ball portion includes an annular ball groove that is parallel to the ball major diameter and disposed on a side of the ball major diameter that is opposed to the shank. In addition, the ball socket is disposed in the first opening. The ball socket has a first end, a sidewall that surrounds a periphery of the first end, and a second end opposed to the first end, the second end being open and defined by a free edge of the sidewall. The sidewall includes an inner surface that has a spherical portion and a retaining portion. The spherical portion receives the ball portion therein. The spherical portion has a shape and dimensions that are complementary to the shape and dimensions of the ball portion, and the retaining portion protrudes inward from the inner surface and includes a terminal edge that resides within the ball groove.

In some aspects, a wiper actuating assembly is configured to actuate a wiper arm and includes an actuator and a linkage that connects the actuator to the wiper arm. The linkage includes a link having a first end including a first opening, and a ball joint that includes a ball stud and a ball socket. The ball stud has a cylindrical shank, and a ball portion disposed on one end of the shank. The ball portion includes a ball major diameter defined by a line that is perpendicular to a longitudinal axis of the shank and intersects the spherical element at a location of maximum diameter. The ball portion also includes an annular ball groove that is parallel to the ball major diameter and is disposed on a side of the ball major diameter that is opposed to the shank. The ball socket is disposed in the first opening. The ball socket has a first end, a sidewall that surrounds a periphery of the first end, and a second end opposed to the first end. The second end is open and defined by a free edge of the sidewall. The sidewall includes an inner surface that has a spherical portion and a retaining portion. The spherical portion receives the ball portion therein, the spherical portion having a shape and dimensions that are complementary to the shape and dimensions of the ball portion. In addition, the retaining portion protrudes inward from the inner surface and includes a terminal edge that resides within the ball groove.

The wiper actuating assembly may include one or more of the following features: The spherical portion defines a socket major diameter that passes through a center of the spherical contour defined by the spherical portion and extends in parallel to the ball socket second end, and the retaining portion is disposed on a side of the socket major diameter opposed to the ball socket second end. The retaining portion includes tabs that protrude inward from the inner surface, and the tabs are spaced apart along a circumference of the sidewall. An outward-facing surface of at least one tab includes a post that protrudes outward. The terminal edge comprises a continuous annular edge defining a terminal edge diameter that is shorter than the ball major diameter. An annular outer groove is formed in an outer surface of the sidewall, the outer groove residing in a plane that is parallel to the ball socket second end and includes a center of the spherical portion; and when the outer groove is parallel to the ball major diameter, the retaining portion terminal edge resides within the ball groove in such a way that outer surfaces of the retaining portion are spaced apart from surfaces of the ball groove. An annular outer groove is formed in an outer surface of the sidewall, the outer groove residing in a plane that is parallel to the ball socket second end and includes a center of the spherical portion; and when the outer groove is parallel to the ball major diameter, the ball socket first end is parallel to the ball major diameter and resides below the planar surface.

In some aspects, a ball joint includes a ball socket assembly that cooperates with a ball stud to provide a durable and reliable rotatable connection between the ball stud and the ball socket. The ball socket assembly includes a socket housing. The socket housing has a retaining portion including internal inwardly protruding tabs that extend into a groove formed in the spherical portion of the ball stud. The tabs are configured to expand to allow insertion of the ball stud into the socket housing. However, the tabs expand in the insertion direction only, preventing withdrawal of the ball stud from the socket housing, particularly when the ball stud is positioned at the certain angular orientations relative to the socket housing.

BRIEF DESCRIPTION OF THE DRAWINGS

FIG. 1 is a top view of a vehicle wiper actuating assembly including a linkage that connects an actuator to a wiper arm (the wiper arm is not shown).

FIG. 2 is a top view of the linkage of FIG. 1 including links that are interconnected using ball joints.

FIG. 7 is a perspective view of an alternative embodiment ball joint.

FIG. 8 is a side cross-sectional view of the ball joint of FIG. 7.

FIG. 11 is a perspective view of yet another alternative embodiment ball joint.

FIG. 12 is a top perspective view of the socket housing of the ball joint of FIG. 11.

FIG. 13 is a bottom perspective view of the socket housing of the ball joint of FIG. 11.

FIG. 14 is an exploded cross-sectional view of the ball joint of FIG. 11.

FIG. 15 is an assembled cross-sectional view of the ball joint of FIG. 11.

DETAILED DESCRIPTION

Figure 3:
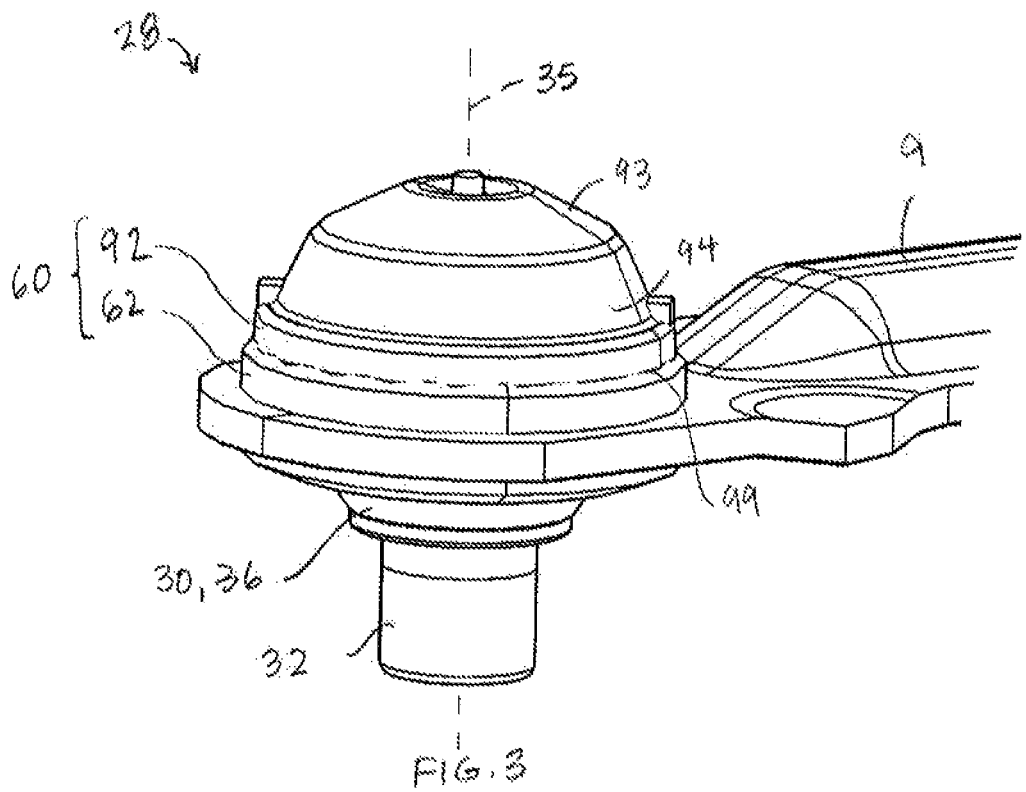
FIG. 3 is a perspective view of a ball joint mounted on an end of one of the links of FIG. 2.
Figure 4:
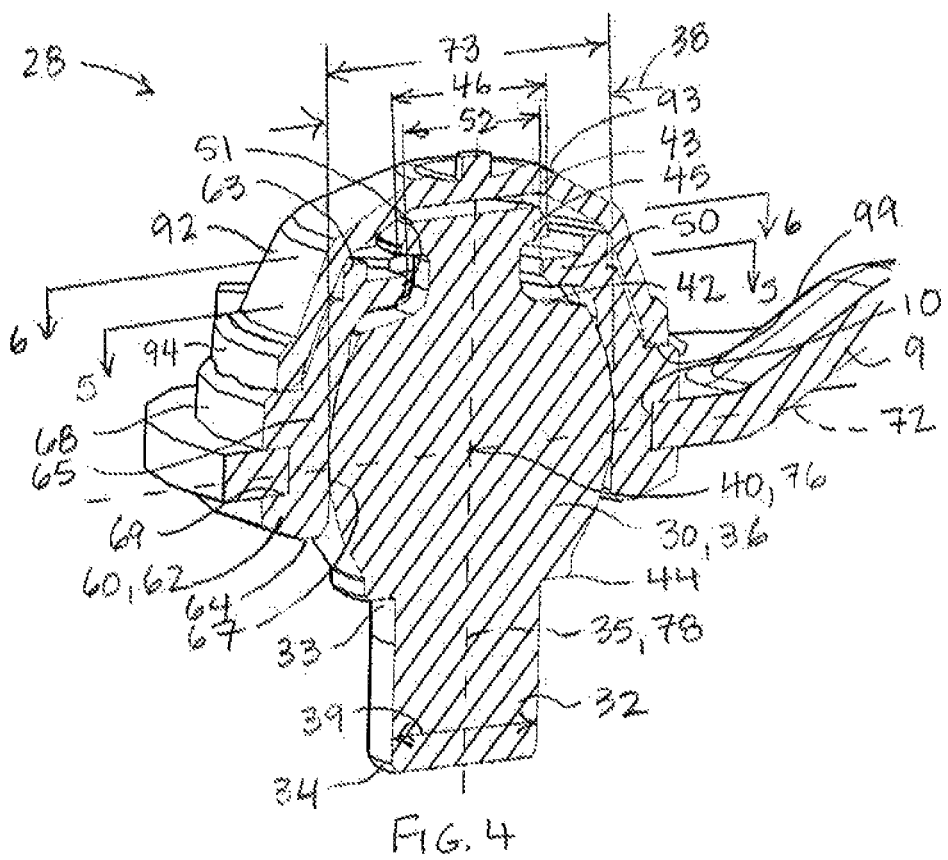
FIG. 4 is a side cross-sectional view of the ball joint of FIG. 3.

Referring to FIGS. 1-4, a vehicle wiper actuating assembly 1 is used to wipe a pair of wiper blades (not shown) over a vehicle windshield (not shown) to clear the windshield of moisture, dirt and/or debris. The wiper actuating assembly 1 includes an actuator 2 and a multi-bar linkage 8 that connects the actuator 2 to wiper arms (not shown), each wiper arm supporting a wiper blade. The wiper arms are supported relative to the vehicle on a pivot shaft (not shown), and the wiper arms are rotated about the pivot shaft by the wiper actuating assembly 1 via the linkage 8. In the illustrated embodiment, the linkage 8 includes four links 9, 12, 15, 18 that are interconnected by ball joints 28. For example, a first end of a first link 9 is connected to a first pivot plate 15 via a first ball joint 28a, and a second end of the first link 9 is connected to a second pivot plate 18 via a second ball joint 28b. The ball joints 28a, 28b each include a socket assembly 60 and a ball stud 30. Both ends of the first link 9 include a link opening 10, and a socket assembly 60 is fixed within the link opening 10. Likewise, an end of each pivot plate 15, 18 includes a pivot plate opening, and a shank 32 of the ball stud 30 is fixed within the pivot plate opening. The socket assembly 60 is configured to receive the ball portion 36 of the ball stud 30, and retain the ball portion 36 therewithin, as discussed in detail below.

The ball stud 30 includes the cylindrical shank 32, and the ball portion 36 disposed on a first end 33 of the shank 32. The shank 32 has a second end 34 that is spaced apart from the first end 33, and a longitudinal axis 35 that extends between the shank first and second ends 33, 34. The ball portion 36 is a generally spherical element that includes a major diameter 38 that is larger than a diameter 39 of the shank 32. The major diameter 38 of the ball portion 36 corresponds to a straight line that is perpendicular to the longitudinal axis 35 of the shank, passes through a center 40 of the ball portion 36 and meets the outer surface of the ball portion 36 at each end.

In addition, the ball portion 36 comprises a ball portion first end 43 that defines a planar surface, and a ball portion second end 44 that is opposed to the first end 43 and is joined to the shank first end 33. The ball portion 36 includes an annular ball groove 42 that is parallel to the ball major diameter 38. The ball groove 42 is disposed between the ball major diameter 38 and the ball portion first end 43, and thus is disposed on a side of the ball major diameter 38 that is opposed to the shank 32. The region of the ball portion 36 between the ball groove 42 and the planar ball portion first end 43 is referred to as a "crown" 45, and a crown diameter 46 of the ball portion 36 corresponds to a diameter of the ball portion 36 at a location between the ball groove 42 and the ball portion first end 43. The crown diameter 46 is shorter than the ball major diameter 38. The crown 45 cooperates with a retaining portion 50 of the socket assembly 60 to provide a secondary retention feature for retaining the ball stud 30 within the socket assembly 60 regardless of the wear condition of the ball joint 28. The retaining portion 50 is described in detail below.

The socket assembly 60 includes a socket housing 62 and a grease seal 92 that closes a first end 63 of the socket housing 62. The socket housing 62 is an annular structure that includes a generally cylindrical sidewall 65 having opposed ends that define the open first end 63 and an open second end 64 that is opposed to the first end 63. An inner surface 67 of the sidewall 65 has a spherical contour that is dimensioned to receive and retain the ball portion 36 of the ball stud therein 30. In particular, the inner surface 67 is shaped and dimensioned to correspond to the shape and dimensions of the ball stud ball portion 36. Like the ball portion 36, the socket housing inner surface 67 defines a major diameter 73. The socket housing major diameter 73 passes through the center 76 of the spherical contour defined by the socket housing inner surface 67 and extends in parallel to the socket housing first and second ends 63, 64. A longitudinal axis 78 of the socket housing 62 intersects the center 76 and is perpendicular to the socket housing first and second ends 63, 64.

The sidewall outer surface 68 is formed having an outer groove 69 that extends about a circumference of the socket housing 62. The outer groove 69 resides in a plane 72 that is parallel to the first end 63 and is disposed at a longitudinal location that corresponds to the socket housing major diameter 73. The outer groove 69 has a cross section that is shaped and dimensioned to correspond to the cross-sectional shape and dimensions of the link opening 10. In the illustrated embodiment for example, the outer groove 69 has a generally rectangular cross sectional shape. In use, the outer groove 69 receives and engages the edge of the opening 10 of the first link 9, whereby the socket housing 62 is fixed to the first link 9.

In some embodiments, the socket housing 62 is a plastic element that is insert molded onto the end of the link 9 so that the edge of the link 9 that defines the opening 10 is received within the first circumferential groove 69.

The sidewall 65 has a longitudinal dimension (e.g., a distance between the socket housing first and second ends 63, 64) that is less than a longitudinal dimension of the ball portion 36 (e.g., a distance between the ball portion first and second ends 43, 44). For example, when the outer groove 69 is parallel to the ball major diameter 38, the ball socket first end 63 is parallel to the ball major diameter 38 and resides below the planar surface of the ball portion first end 43. In addition, the ball socket second end 64 is disposed between the ball major diameter 38 and the shank first end 33.

A retaining portion 50 is provided on the inner surface 67 of the sidewall 65 at a location adjacent to the socket housing first end 63, and thus the retaining portion 50 is disposed on a side of the socket major diameter 38 opposed to the socket housing second end 64. The retaining portion 50 protrudes inward from the sidewall inner surface 67. In particular, the retaining portion 50 extends in a direction parallel to the socket housing major diameter 73 to an extent that a terminal edge 51 of the retaining portion 50 resides in the ball groove 42.

In the illustrated embodiment, the retaining portion 50 is dimensioned such that the crown diameter 46 is longer than the terminal edge diameter 52. When the socket housing 62 is oriented relative to the ball stud 30 such that the outer groove 69 is parallel to the ball major diameter 38, a terminal edge 51 of the retaining portion 50 resides within the ball groove 42 in such a way that outer surfaces of the retaining portion 50, including the terminal edge 51, are spaced apart from surfaces of the ball groove 42.

Figure 5:
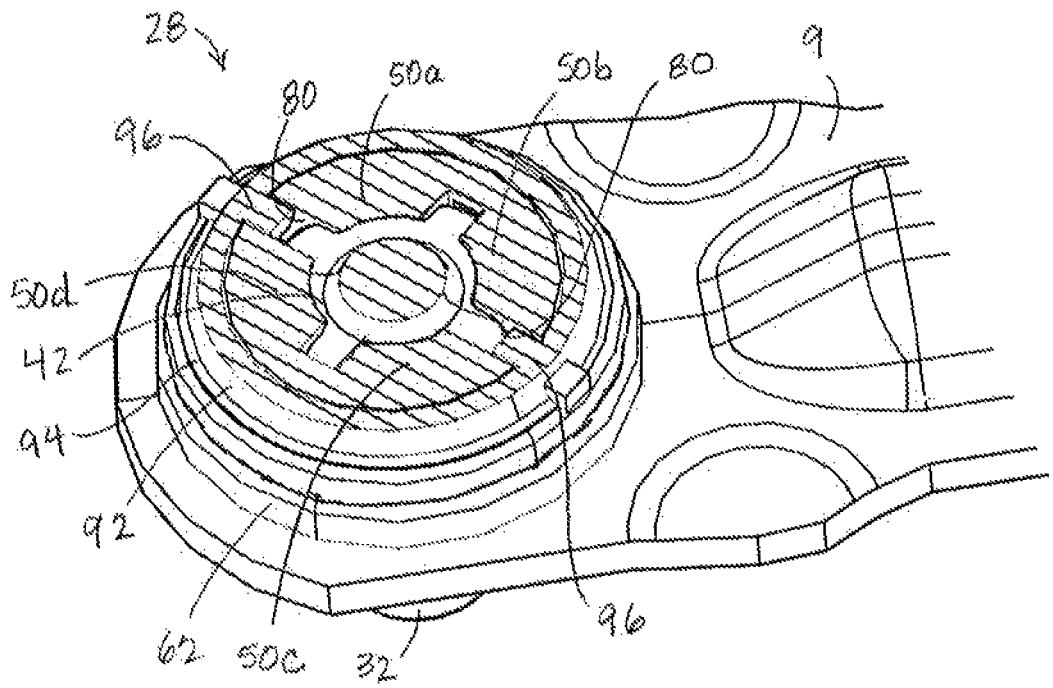
FIG. 5 is a top cross-sectional view of the ball joint of FIG. 3 as seen along line 5-5 of FIG. 4.

Referring to FIG. 5, the retaining portion 50 is circumferentially discontinuous so that the retaining portion 50 is formed of individual tabs 50a, 50b, 50c, 50d that protrude inward from the socket housing inner surface 67. In the illustrated embodiment, the tabs 50a, 50b, 50c, 50d are equidistantly spaced apart along a circumference of the sidewall 65.

The tabs 50a, 50b, 50c, 50d are sufficiently flexible to permit expansion of the retaining portion 50 during insertion of the ball portion 36 into the socket housing 62. However, the tabs 50a, 50b, 50c, 50d are configured to engage with the crown 45 if the ball stud moves in the direction of withdrawal, particularly when disengagement is attempted while the socket housing 62 is oriented relative to the ball stud 30 such that the outer groove 69 is at a predetermined angle relative to the ball major diameter 38 or an angle greater than the predetermined angle. In these situations, the retaining portion 50 engages the crown 45, preventing the ball stud 30 from detaching from the socket assembly 60. In the illustrated embodiment, the predetermined angle is about 10 degrees. By altering the shape and/or spacing of the tabs 50a, 50b, 50c, 50d, ball groove 42 and/or crown 45, the predetermined angle can be changed to address the needs of a specific application.

The grease seal 92 is a detachable cover that is configured to close the socket housing first end 63 in such a way that lubricant provided between the ball portion 36 and the socket housing 62 is prevented from exiting the socket housing 62 via the socket housing first end 63. The grease seal 92 is a dome-shaped structure that includes an outwardly convex end portion 93 and a skirt 94 that surrounds a periphery of the end portion 93. The end portion 93 overlies and is spaced apart from the crown 45. The skirt 94 surrounds the sidewall outer surface 68 adjacent the socket housing first end 63. The skirt 94 is slightly curved when seen in cross section to match the contour of the socket housing outer surface 68, and has a greater diameter a free end 99 of the skirt than adjacent the grease seal end portion 93. A pair of latches 96 protrude inward from an inner surface of the skirt 94 and are received in recesses 80 formed in the socket housing outer surface 68. The latches 96 retain the grease seal 92 on the socket housing first end 63.

Figure 6:
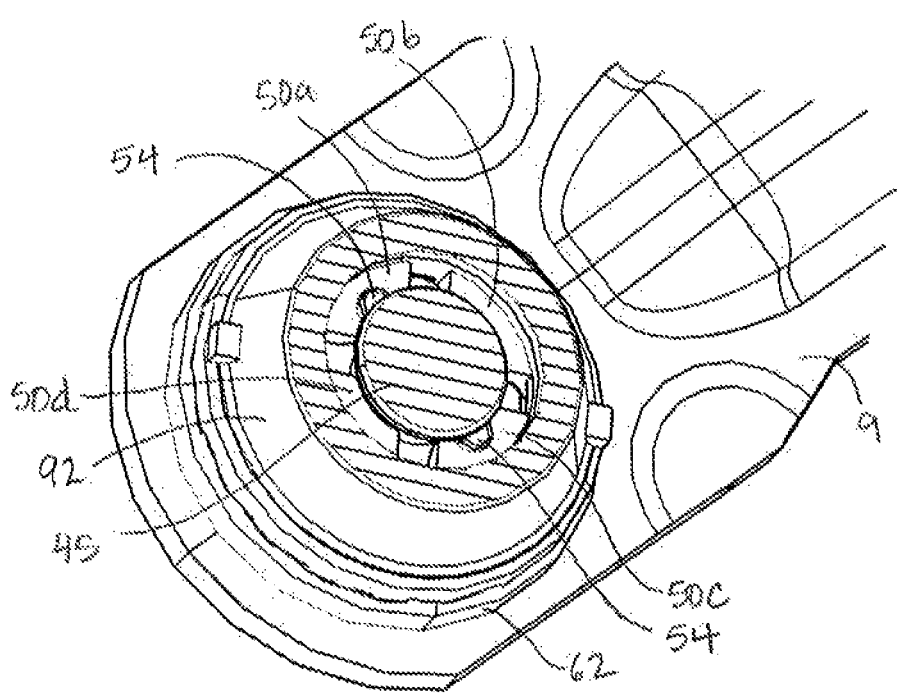
FIG. 6 is a top cross-sectional view of the ball joint of FIG. 3 as seen along line 6-6 of FIG. 4.

Referring to FIG. 6, in some embodiments, the socket housing 62 includes features that limit the amount of rotation of the ball portion 36 relative to the socket housing 62 about the shank longitudinal axis 35. For example, longitudinally-extending posts 54 may be provided on the outward-facing surfaces certain tabs 50a, 50c of the retaining portion 50. In the illustrated embodiment, a post 54 is disposed on a pair of tabs 50a, 50c that are on diagonally opposed sides of the crown 45. The posts 54 provide a rotation limiter by engaging a portion of an inner surface of the grease seal end portion 93.

Referring to FIGS. 7 and 8, an alternative embodiment socket assembly 160 includes a socket housing 162 and a grease seal 192 that closes a first end 163 of the socket housing 162. The grease seal 192 has a different configuration than the grease seal 92 described above with respect to FIGS. 3-6, and will be described in detail below.

The socket housing 162 is an annular structure that includes a generally cylindrical sidewall 165 having opposed ends that define the open socket housing first end 163 and an open socket housing second end 164 that is opposed to the first end 163. An inner surface 167 of the sidewall 165 has a spherical contour that is dimensioned to receive and retain the ball portion 36 of the ball stud therein 30. In particular, the inner surface 167 is shaped and dimensioned to correspond to the shape and dimensions of the ball stud ball portion 36. Like the ball portion 36, the socket housing inner surface 167 defines a major diameter 173. The socket housing major diameter 173 passes through the center 176 of the spherical contour defined by the socket housing inner surface 167 and extends in parallel to the socket housing first and second ends 163, 164. A longitudinal axis 178 of the socket housing 162 intersects the center 176 and is perpendicular to the socket housing first and second ends 163, 164.

The sidewall outer surface 168 is formed having an outer groove 169 that extends about a circumference of the socket housing 162. The outer groove 169 resides in a plane 172 that is parallel to the first end 163 and is disposed at a longitudinal location that corresponds to the socket housing major diameter 173. The outer groove 169 has a cross section that is shaped and dimensioned to correspond to the cross-sectional shape and dimensions of the link opening 10. In use, the outer groove 169 receives and engages the edge of the opening 10 of the first link 9, whereby the socket housing 162 is fixed to the first link 9.

The sidewall 165 has a longitudinal dimension (e.g., a distance between the socket housing first and second ends 163, 164) that is less than a longitudinal dimension of the ball portion 36 (e.g., a distance between the ball portion first and second ends 43, 44). For example, when the outer groove 169 is parallel to the ball major diameter 38, the socket housing first end 163 is parallel to the ball major diameter 38 and resides approximately flush with the planar surface of the ball portion first end 43. The ball socket second end 164 is disposed between the ball major diameter 38 and the shank first end 33.

The retaining portion 50 is provided on the inner surface 167 of the sidewall 165 at a location adjacent to the socket housing first end 163. The retaining portion 50 provided on the socket housing 162 is substantially the same as described above with respect to FIGS. 3-6, and therefore the description will not be repeated here.

The grease seal 192 is a detachable cover that is configured to close the socket housing first end 163 in such a way that lubricant provided between the ball portion 36 and the socket housing 162 is prevented from exiting the socket housing 162 via the socket housing first end 163. The grease seal 192 is a dome-shaped structure that includes an outwardly convex end portion 193 and an annular rim 195. The annular rim 195 protrudes from an inner surface of the end portion 193 in a direction parallel to the longitudinal axis 178, and is disposed adjacent a peripheral edge 197 of the end portion 193. The end portion 193 overlies and is spaced apart from the crown 45. The end portion peripheral edge 197 rests on the socket housing first end 163, and the rim 195 abuts the sidewall inner surface 167 adjacent the socket housing first end 163. More specifically, the rim 195 is received in the opening defined by the socket housing first end 163 in a press-fit relationship with respect to the sidewall inner surface 167, whereby the grease seal 192 is retained on the socket housing first end 163.

Figure 9:
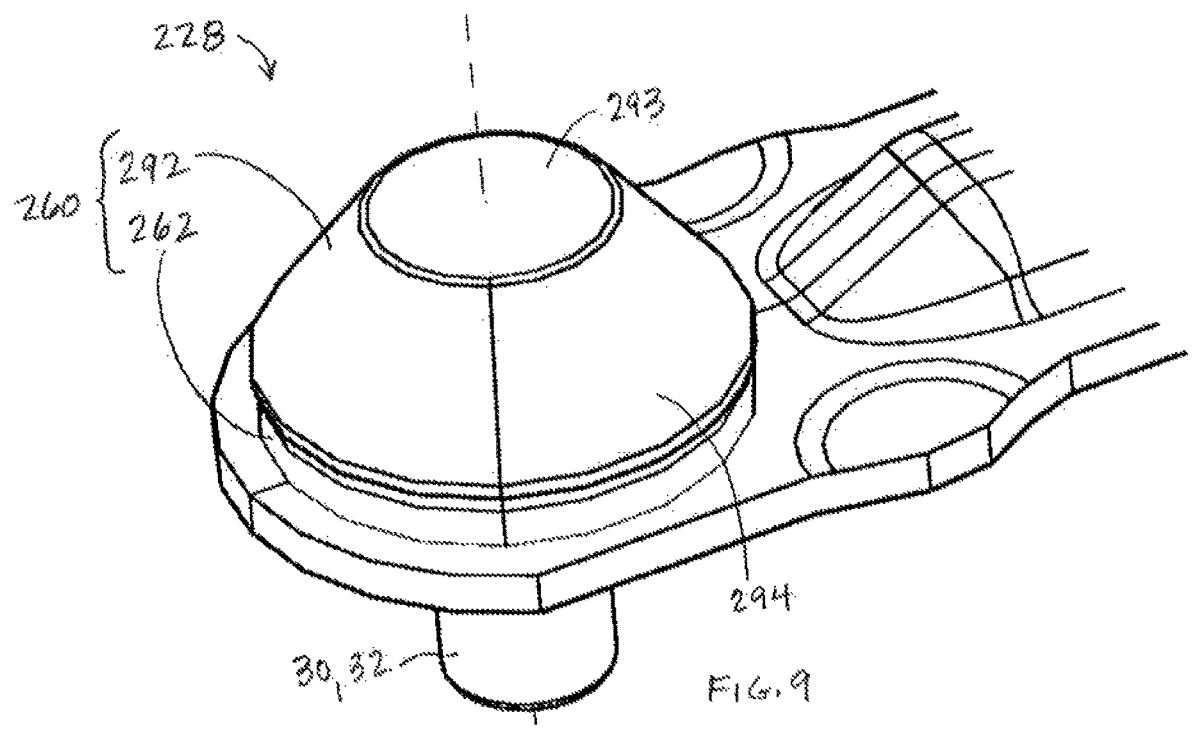
FIG. 9 is a perspective view of another alternative embodiment ball joint.
Figure 10:
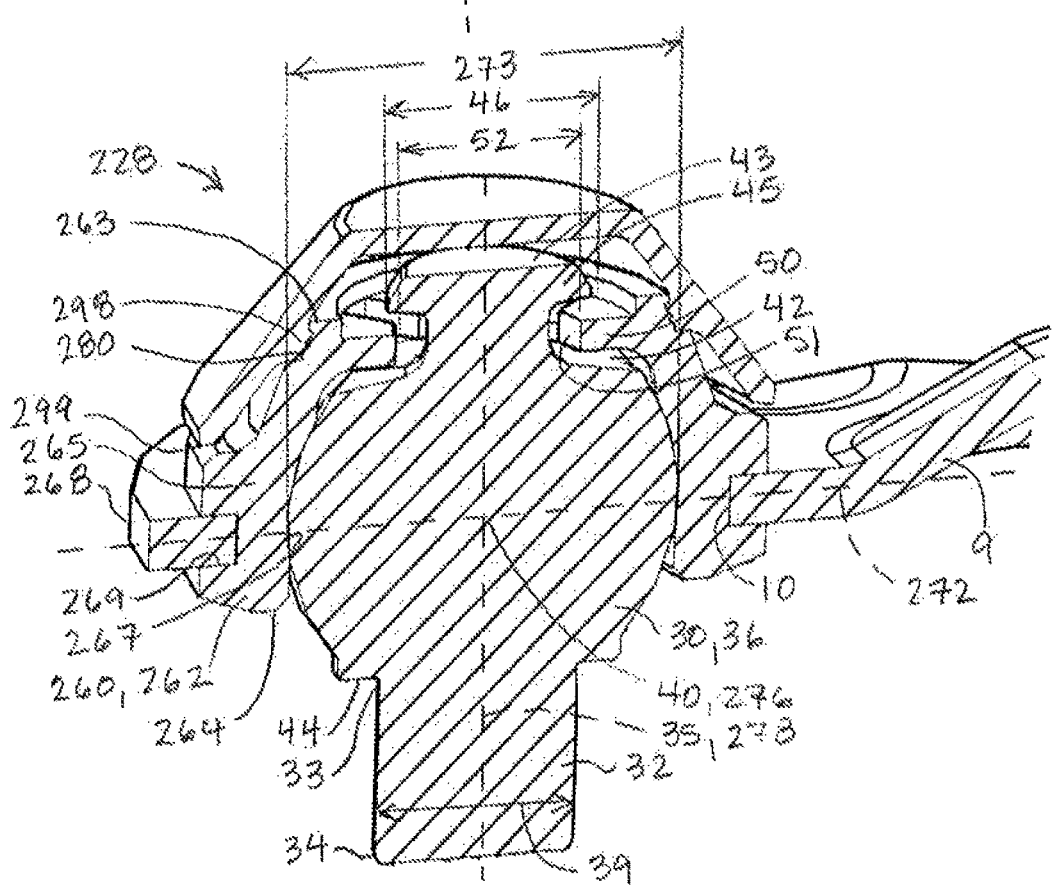
FIG. 10 is a side cross-sectional view of the ball joint of FIG. 9.

Referring to FIGS. 9 and 10, another alternative embodiment socket assembly 260 includes a socket housing 262 and a grease seal 292 that closes a first end 263 of the socket housing 262. The grease seal 292 has a different configuration than the grease seals 92, 192 described above with respect to FIGS. 3-6 and FIGS. 7-8, and will be described in detail below.

The socket housing 262 is an annular structure that includes a generally cylindrical sidewall 265 having opposed ends that define the open first end 263 and an open second end 264 that is opposed to the first end 263. An inner surface 267 of the sidewall 265 has a spherical contour that is dimensioned to receive and retain the ball portion 36 of the ball stud therein 30. In particular, the inner surface 267 is shaped and dimensioned to correspond to the shape and dimensions of the ball stud ball portion 36. Like the ball portion 36, the socket housing inner surface 267 defines a major diameter 273. The socket housing major diameter 273 passes through the center 276 of the spherical contour defined by the socket housing inner surface 267 and extends in parallel to the socket housing first and second ends 263, 264. A longitudinal axis 278 of the socket housing 262 intersects the center 276 and is perpendicular to the socket housing first and second ends 263, 264.

The sidewall outer surface 268 is formed having an outer groove 269 that extends about a circumference of the socket housing 262. The outer groove 269 resides in a plane 272 that is parallel to the first end 263 and is disposed at a longitudinal location that corresponds to the socket housing major diameter 273. The outer groove 269 has a cross section that is shaped and dimensioned to correspond to the cross-sectional shape and dimensions of the link opening 10. In the illustrated embodiment for example, the outer groove 269 has a generally rectangular cross sectional shape. In use, the outer groove 269 receives and engages the edge of the opening 10 of the first link 9, whereby the socket housing 262 is fixed to the first link 9.

The sidewall 265 has a longitudinal dimension (e.g., a distance between the socket housing first and second ends 263, 264) that is less than a longitudinal dimension of the ball portion 36 (e.g., a distance between the ball portion first and second ends 43, 44). For example, when the outer groove 269 is parallel to the ball major diameter 38, the ball socket first end 263 is parallel to the ball major diameter 38 and resides below the planar surface of the ball portion first end 43. In addition, the ball socket second end 264 is disposed between the ball major diameter 38 and the shank first end 33.

A retaining portion 50 is provided on the inner surface 267 of the sidewall 165 at a location adjacent to the socket housing first end 263. The retaining portion 50 provided on the socket housing 262 is substantially the same as described above with respect to FIGS. 3-6.

The grease seal 292 is a detachable cover that is configured to close the socket housing first end 263 in such a way that lubricant provided between the ball portion 36 and the socket housing 262 is prevented from exiting the socket housing 262 via the socket housing first end 263. The grease seal 292 is a dome-shaped structure that includes a generally planar end portion 293 and a skirt 294 that surrounds a periphery of the end portion 293. The end portion 293 overlies and is spaced apart from the crown 45. The skirt 294 surrounds the sidewall outer surface 268 adjacent the socket housing first end 263. The skirt 294 is linear when seen in cross section, and has a greater diameter at a free end of the skirt 299 than adjacent the end portion 293. An annular protrusion 298 is provided on an inner surface of the skirt 294. The annular protrusion 298 extends in a direction perpendicular to the longitudinal axis 278, and is disposed midway between the end portion 293 and the free end 299 of the skirt 294. The annular protrusion 298 is received in a corresponding annular recess 280 formed in the socket housing outer surface 268. The annular protrusion 298 and the recess 280 cooperate to retain the grease seal 292 on the socket housing first end 263.

Referring to FIGS. 11-15, another alternative embodiment socket assembly 460 can be used with the ball stud 30 to form a ball joint 428. The socket assembly 460 includes a socket housing 462 and a grease seal 192 that closes a first end 163 of the socket housing 462. The socket housing 462 described in FIGS. 11-15 has similarities to the socket housing 162 described above with respect to FIGS. 7 and 8, and thus common elements will be described with common reference numbers. However, the retaining portion 450 of the socket housing 462 described in FIGS. 11-15 differs from the retaining portion 50 of the socket housing 162 described above with respect to FIGS. 7 and 8, and will be described in detail below.

The retaining portion 450 is provided on the inner surface 167 of the sidewall 165 at a location adjacent to the socket housing first end 163, and thus the retaining portion 450 is disposed on a side of the socket major diameter 38 opposed to the socket housing second end 164. The retaining portion 450 protrudes inward from the sidewall inner surface 167. In particular, the retaining portion 450 extends in a direction parallel to the socket housing major diameter 73 to an extent that a terminal edge 451 of the retaining portion 450 resides in the ball groove 42.

In the illustrated embodiment, the retaining portion 450 is dimensioned such that the crown diameter 46 is longer than the terminal edge diameter 452. When the socket housing 162 is oriented relative to the ball stud 30 such that the outer groove 169 is parallel to the ball major diameter 38, a terminal edge 451 of the retaining portion 450 resides within the ball groove 42 in such a way that outer surfaces of the retaining portion 450, including the terminal edge 451, are spaced apart from surfaces of the ball groove 42.

Referring to FIGS. 12 and 13, the retaining portion 450 is circumferentially discontinuous so that the retaining portion 450 is formed of two individual tabs 450a, 450b that protrude inward from the socket housing inner surface 167. The tabs 450a, 450b are equidistantly spaced apart along a circumference of the sidewall 165, and have a crescent shape when viewed in a direction parallel to the longitudinal axis 178 of the socket housing 162. The concave portions of the tabs 450a, 450b face each other, so that tabs 450a, 450b are more closely spaced adjacent to the socket housing inner surface 167 than along a centerline of the socket housing 162.

The tabs 450a, 450b, are sufficiently flexible to permit expansion of the retaining portion 450 during insertion of the ball portion 36 into the socket housing 162. However, the tabs 450a, 450b are configured to engage with the crown 45 if the ball stud moves in the direction of withdrawal, particularly when disengagement is attempted while the socket housing 62 is oriented relative to the ball stud 30 such that the outer groove 69 is at a predetermined angle relative to the ball major diameter 38 or an angle greater than the predetermined angle. In these situations, the retaining portion 450 engages the crown 45, preventing the ball stud 30 from detaching from the socket assembly 60. In the illustrated embodiment, the predetermined angle is about 10 degrees. By altering the shape and/or spacing of the tabs 450a, 450b, ball groove 42 and/or crown 45, the predetermined angle can be changed to address the needs of a specific application.

Figure 16:
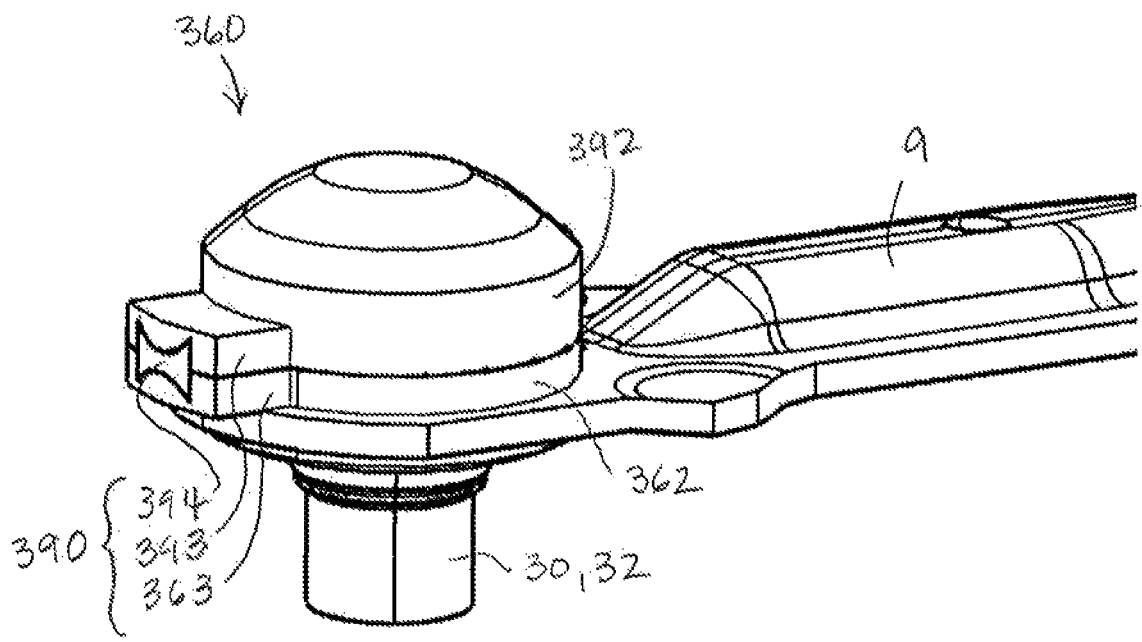
FIG. 16 is a perspective view of yet another alternative embodiment ball joint having a grease seal connected to a socket housing via a living hinge, shown with the living hinge in a closed position.
Figure 17:
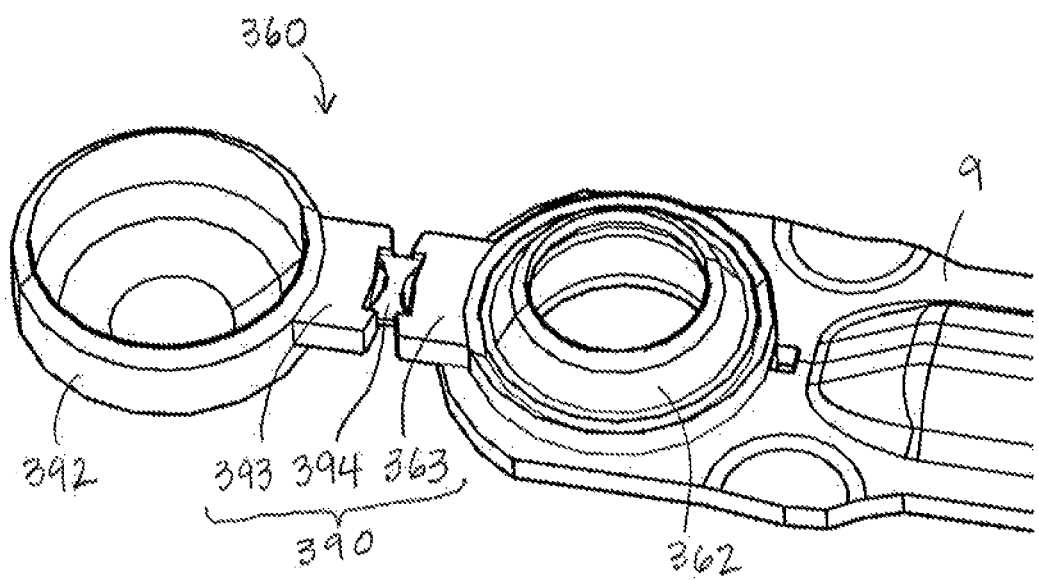
FIG. 17 is a perspective view of the ball joint of FIG. 16 shown with the living hinge in an open position.

Referring to FIGS. 16 and 17, in the illustrated embodiments, the socket assembly 60, 160, 260 includes a socket housing 62, 162, 262 and a grease seal 92, 192, 292 that is detachably secured to the socket housing 62, 162, 262. However, the socket assembly 60, 160, 260 is not limited to a configuration in which the grease seal can be detached from the socket housing. For example, in another alternative embodiment socket assembly 360, a grease seal 392 is integrally connected to a socket housing 362 via a living hinge 390. The living hinge 390 is a thin, flexible connection that is integral to both of the socket housing 362 and the grease seal 392. In the illustrated embodiment, the living hinge 390 includes a first flange 363 that protrudes from an outer surface of the socket housing 362, a second flange 393 that protrudes from an outer surface of the grease seal 392, and a connector 394 that joins the first flange 363 to the second flange 393. The connector 394 is relatively thin compared to the thickness of the first and second flanges 363, 393. In particular, the connector 394 is sufficiently thin to permit folding of the living hinge 390 at this location. The grease seal 392 may be retained in an assembled configuration on the first end of the socket housing 362 via a press fit, a latching element (not shown), or other securing mechanism.

In the illustrated embodiments, the retaining portion 50 is formed of four individual equidistantly-spaced tabs 50a, 50b, 50c, 50d that protrude inward from the socket housing inner surface 67. However, the retaining portion 50 is not limited to this configuration. In one example, a greater or fewer number of tabs can be provided. In another example, the tabs are not equally spaced such that some adjacent pairs of tabs are more closely spaced than others. In yet another example, the retaining portion may be a single, continuous annulus in which the terminal edge 51 defines comprises a continuous annular edge (see element 362 in FIG. 12).

Selective illustrative embodiments of the ball joint for the vehicle wiper actuating assembly are described above in some detail. It should be understood that only structures considered necessary for clarifying the ball joint have been described herein. Other conventional structures, and those of ancillary and auxiliary components of the ball joint and the vehicle wiper actuating assembly, are assumed to be known and understood by those skilled in the art. Moreover, while a working example of the vehicle wiper actuating assembly including ball joints has been described above, the vehicle wiper actuating assembly and/or the ball joints are not limited to the working example described above, but various design alterations may be carried out without departing from the vehicle wiper actuating assembly and/or ball joint as set forth in the claims.

I claim:

1. A ball joint comprising a ball stud and a ball socket, wherein the ball stud includes a cylindrical shank, and a ball portion disposed on one end of the shank, the ball portion including a ball major diameter defined by a line that is perpendicular to a longitudinal axis of the shank and intersects the spherical element at a location of maximum diameter, the ball portion including an annular ball groove that is parallel to the ball major diameter and disposed on a side of the ball major diameter that is opposed to the shank;
the ball socket includes
a ball socket first end,
a sidewall that surrounds a periphery of the ball socket first end,
a ball socket second end opposed to the ball socket first end, the ball socket second end being open and defined by a free edge of the sidewall, and
a ball socket longitudinal axis that is perpendicular to the ball socket first end and the ball socket second end,
wherein
the sidewall includes an inner surface that has a spherical portion and a retaining portion,
the spherical portion receives the ball portion therein, the spherical portion having a shape and dimensions that are complementary to the shape and dimensions of the ball portion,
the retaining portion protrudes inward from the inner surface and including a terminal edge that resides within the ball groove,
the ball socket first end is closed via a detachable cover that provides a fluid seal at the ball socket first end,
the detachable cover includes an end portion and an annular rim,
the rim protrudes from an inner surface of the end portion in a direction parallel to the ball socket longitudinal axis,
the peripheral edge of the end portion rests on the ball socket first end, and
the rim abuts the sidewall inner surface in a press-fit relationship with respect to the sidewall inner surface whereby the detachable cover is retained on the ball socket first end.

2. The ball joint of claim 1, wherein the spherical portion defines a socket major diameter that passes through a center of the spherical contour defined by the spherical portion and extends in parallel to the ball socket second end, and the retaining portion is disposed on a side of the socket major diameter opposed to the ball socket second end.

3. The ball joint of claim 1, wherein the retaining portion comprises tabs that protrude inward from the inner surface, the tabs being spaced apart along a circumference of the sidewall.

4. The ball joint of claim 3, wherein an outward-facing surface of at least one tab includes a post that protrudes outward.

5. The ball joint of claim 1, wherein the terminal edge comprises a continuous annular edge defining a terminal edge diameter that is shorter than the ball major diameter.

6. The ball joint of claim 1, wherein an annular outer groove is formed in an outer surface of the sidewall, the outer groove residing in a plane that is parallel to the ball socket second end and includes a center of the spherical portion; and
when the outer groove is parallel to the ball major diameter, the retaining portion terminal edge resides within the ball groove in such a way that outer surfaces of the retaining portion are spaced apart from surfaces of the ball groove.

7. The ball joint of claim 1, wherein
the ball portion comprises a ball portion first end that defines a planar surface, and a ball portion second end that is opposed to the first end and is joined to the shank,
a crown diameter of the ball portion corresponds to a diameter of the ball portion at a location between the ball groove and the ball portion first end, and
the crown diameter is longer than the terminal edge diameter and is shorter than the ball major diameter.

8. The ball joint of claim 7. wherein an annular outer groove is formed in an outer surface of the sidewall, the outer groove residing in a plane that is parallel to the ball socket second end and includes a center of the spherical portion; and
when the outer groove is parallel to the ball major diameter, the ball socket first end is parallel to the ball major diameter and resides below the planar surface.

9. A link assembly, comprising
a link having a first end including a first opening;
a ball joint that includes a ball stud and a ball socket, wherein
the ball stud having
a cylindrical shank, and
a ball portion disposed on one end of the shank, the ball portion including a ball major diameter defined by a line that is perpendicular to a longitudinal axis of the shank and intersects the spherical element at a location of maximum diameter, the ball portion including an annular ball groove that is parallel to the ball major diameter and disposed on a side of the ball major diameter that is opposed to the shank; and
the ball socket disposed in the first opening, the ball socket having
a first end,
a sidewall that surrounds a periphery of the first end,
a second end opposed to the first end, the second end being open and defined by a free edge of the sidewall, and
a ball socket longitudinal axis that is perpendicular to the first end and the second end,
wherein
the sidewall includes an inner surface that has a spherical portion and a retaining portion,
the spherical portion receives the ball portion therein, the spherical portion having a shape and dimensions that are complementary to the shape and dimensions of the ball portion, and the retaining portion protrudes inward from the inner surface and including a terminal edge that resides within the ball groove,
the first end is closed via a detachable cover that provides a fluid seal at the first end,
the detachable cover includes an end portion and an annular rim,
the rim protrudes from an inner surface of the end portion in a direction parallel to the ball socket longitudinal axis,
the peripheral edge of the end portion rests on the first end. and
the rim abuts the sidewall inner surface in a press-fit relationship with respect to the sidewall inner surface whereby the detachable cover is retained on the first end.

10. A wiper actuating assembly configured to actuate a wiper arm, the assembly comprising
an actuator;
a linkage that connects the actuator to the wiper arm, the linkage including
a link having a first end including a first opening;
a bail joint that includes a ball stud and a ball socket, wherein
the ball stud having a cylindrical shank, and a ball portion disposed on one end of the shank, the ball portion including a ball major diameter defined by a line that is perpendicular to a longitudinal axis of the shank and intersects the spherical element at a location of maximum diameter, the ball portion including an annular ball groove that is parallel to the ball major diameter and disposed on a side of the ball major diameter that is opposed to the shank; and the ball socket disposed in the first opening, the ball socket having a first end, a sidewall that surrounds a periphery of the first end, a second end opposed to the first end, the second end being open and defined by a free edge of the sidewall, and a ball socket longitudinal axis that is perpendicular to the ball socket first end and the ball socket second end, wherein the sidewall includes an inner surface that has a spherical portion and a retaining portion, the spherical portion receives the ball portion therein, the spherical portion having a shape and dimensions that are complementary to the shape and dimensions of the ball portion, and the retaining portion protrudes inward from the inner surface and including a terminal edge that resides within the ball groove, the first end is closed via a detachable cover that provides a fluid seal at the first end, the detachable cover includes an end portion and an annular rim, the rim protrudes from an inner surface of the end portion in a direction parallel to the ball socket longitudinal axis, the peripheral edge of the end portion rests on the first end, and the rim abuts the sidewall inner surface in a press-fit relationship with respect to the sidewall inner surface whereby the detachable cover is retained on the first end.

11. The wiper actuating assembly of claim 10, wherein the spherical portion defines a socket major diameter that passes through a center of the spherical contour defined by the spherical portion and extends in parallel to the ball socket second end, and the retaining portion is disposed on a side of the socket major diameter opposed to the ball socket second end.

12. The wiper actuating assembly of claim 10, wherein the retaining portion comprises tabs that protrude inward from the inner surface, the tabs being spaced apart along a circumference of the sidewall.

13. The wiper actuating assembly of claim 12, wherein an outward-facing surface of at least one tab includes a post that protrudes outward.

14. The wiper actuating assembly of claim 10, wherein the terminal edge comprises a continuous annular edge defining a terminal edge diameter that is shorter than the ball major diameter.

15. The wiper actuating assembly of claim 10, wherein an annular outer groove is formed in an outer surface of the sidewall, the outer groove residing in a plane that is parallel to the ball socket second end and includes a center of the spherical portion; and when the outer groove is parallel to the ball major diameter, the retaining portion terminal edge resides within the ball groove in such a way that outer surfaces of the retaining portion are spaced apart from surfaces of the ball groove.

16. The wiper actuating assembly of claim 15, wherein an annular outer groove is formed in an outer surface of the sidewall, the outer groove residing in a plane that is parallel to the ball socket second end and includes a center of the spherical portion; and when the outer groove is parallel to the ball major diameter, the ball socket first end is parallel to the ball major diameter and resides below the planar surface.

* * * * *

UNITED STATES PATENT AND TRADEMARK OFFICE
CERTIFICATE OF CORRECTION

PATENT NO. : 11,578,752 B2
APPLICATION NO. : 16/475932
DATED : February 14, 2023
INVENTOR(S) : Koppen It is certified that error appears in the above-identified patent and that said Letters Patent is hereby corrected as shown below:

In the Claims

In Claim 8, at Column 12, Line 6: "claim 7. wherein" should read --claim 7, wherein--;

In Claim 9, at Column 12, Lines 53-54: "the first end. and" should read --the first end, and--; and In Claim 10, at Column 12, Line 65: "a bail joint" should read --a ball joint--.

Signed and Sealed this
Twentieth Day of June, 2023

Katherine Kelly Vidal
*Director of the United States Patent and Trademark Office*